(12) United States Patent
Ryu

(10) Patent No.: US 12,081,049 B2
(45) Date of Patent: Sep. 3, 2024

(54) BATTERY MANAGEMENT CIRCUIT, ENERGY STORAGE DEVICE, AND BATTERY MANAGEMENT METHOD

(71) Applicant: Nuvoton Technology Corporation Japan, Kyoto (JP)

(72) Inventor: Takashi Ryu, Kyoto (JP)

(73) Assignee: NUVOTON TECHNOLOGY CORPORATION JAPAN, Kyoto (JP)

(*) Notice: Subject to any disclaimer, the term of this patent is extended or adjusted under 35 U.S.C. 154(b) by 0 days.

(21) Appl. No.: 17/580,030

(22) Filed: Jan. 20, 2022

(65) Prior Publication Data

US 2022/0149635 A1 May 12, 2022

Related U.S. Application Data

(63) Continuation of application No. PCT/JP2020/027451, filed on Jul. 15, 2020.

(30) Foreign Application Priority Data

Jul. 25, 2019 (JP) .................. 2019-137184

(51) Int. Cl.
*H02J 7/00* (2006.01)
*H01M 10/42* (2006.01)
(Continued)

(52) U.S. Cl.
CPC ......... *H02J 7/0024* (2013.01); *H01M 10/425* (2013.01); *H01M 10/482* (2013.01);
(Continued)

(58) Field of Classification Search
CPC .......... H02J 7/0024; H02J 7/0014; H02J 7/04; H02J 7/345; H01M 10/425; H01M 10/482;
(Continued)

(56) References Cited

U.S. PATENT DOCUMENTS

| 5,710,504 A | 1/1998 | Pascual et al. |
| 7,400,113 B2 * | 7/2008 | Osborne ............... H02J 7/0018 320/118 |

(Continued)

FOREIGN PATENT DOCUMENTS

| CN | 103078356 A | * | 5/2013 | ............ H01M 10/44 |
| CN | 104184183 A | * | 12/2014 | ............ H02J 7/0014 |

(Continued)

OTHER PUBLICATIONS

International Search Report and Written Opinion issued in International Patent Application No. PCT/JP2020/027451, dated Aug. 18, 2020; with partial English translation.

*Primary Examiner* — M Baye Diao
(74) *Attorney, Agent, or Firm* — Rimon P.C.

(57) ABSTRACT

A battery management circuit that is provided for each of sets of battery cells connected in series in an energy storage device including the sets of the battery cells and at least one capacitor, and that includes: a positive connection terminal to be connected to a positive electrode of a corresponding one of the sets of the battery cells; a negative connection terminal to be connected to a negative electrode of the corresponding one of the sets of the battery cells; a capacitor connection terminal to be connected to a terminal of the at least one capacitor; and a control circuit that controls a connection operation of connecting the positive connection terminal or the negative connection terminal to the capacitor connection terminal, and causes the battery management circuit to perform the connection operation in synchronization with the connection operation of another battery management circuit among battery management circuits.

13 Claims, 9 Drawing Sheets

(51) Int. Cl.
*H01M 10/48* (2006.01)
*H02J 7/04* (2006.01)
*H02J 7/34* (2006.01)

(52) U.S. Cl.
CPC .............. *H02J 7/0014* (2013.01); *H02J 7/04* (2013.01); *H02J 7/345* (2013.01); *H01M 2010/4271* (2013.01)

(58) Field of Classification Search
CPC ....... H01M 2010/4271; H01M 50/204; H01M 50/51; H01M 10/4264; H01M 50/569; Y02E 60/10
USPC .......................................................... 320/116
See application file for complete search history.

(56) References Cited

U.S. PATENT DOCUMENTS

| | | | |
|---|---|---|---|
| 10,862,318 B2* | 12/2020 | Stuart | ................... H02J 7/0019 |
| 2001/0054877 A1 | 12/2001 | Kinoshita | |
| 2008/0061764 A1* | 3/2008 | Tae | .......................... B60L 58/16 324/72 |
| 2012/0139493 A1 | 6/2012 | Sakurai et al. | |
| 2014/0285936 A1* | 9/2014 | Garbacik | ................. B60L 58/15 361/88 |

FOREIGN PATENT DOCUMENTS

| | | | | |
|---|---|---|---|---|
| DE | 102017213472 A1 | * | 2/2019 | ............ H02J 7/0047 |
| EP | 1901412 A2 | * | 3/2008 | ............ B60L 3/0038 |
| EP | 3561940 B1 | * | 8/2022 | ......... G01R 31/3835 |
| JP | 10-225005 A | | 8/1998 | |
| JP | 2000-511398 A | | 8/2000 | |
| JP | 2002-042901 A | | 2/2002 | |
| JP | 2012-139088 A | | 7/2012 | |
| JP | 2015-033237 A | | 2/2015 | |
| JP | 2015-037339 A | | 2/2015 | |
| KR | 20190037883 A | * | 4/2019 | .......... H01M 10/425 |
| WO | 97/44877 A1 | | 11/1997 | |

* cited by examiner

BATTERY MANAGEMENT CIRCUIT, ENERGY STORAGE DEVICE, AND BATTERY MANAGEMENT METHOD

CROSS REFERENCE TO RELATED APPLICATIONS

This is a continuation application of PCT International Application No. PCT/JP2020/027451 filed on Jul. 15, 2020, designating the United States of America, which is based on and claims priority of Japanese Patent Application No. 2019-137184 filed on Jul. 25, 2019. The entire disclosures of the above-identified applications, including the specifications, drawings and claims are incorporated herein by reference in their entirety.

FIELD

The present disclosure relates to an energy storage device including sets of battery cells connected in series and at least one capacitor, a battery management circuit provided for each of the sets of the battery cells in the energy storage device, and a battery management method.

BACKGROUND

Patent Literature (PTL) 1 discloses the technique of balancing the voltages of battery cells among sets of battery cells connected in series.

CITATION LIST

Patent Literature

PTL 1: Japanese Unexamined Patent Application Publication (Translation of PCT Application) No. 2000-511398

SUMMARY

Technical Problem

The conventional technique has a problem that a great power loss may occur in a voltage balancing operation.

In view of the above, the present disclosure provides a battery management circuit, an energy storage device, and a battery management method that reduce a power loss in voltage balancing.

Solution to Problem

A battery management circuit according to an aspect of the present disclosure for solving the above problem is a battery management circuit provided for each of sets of battery cells connected in series in an energy storage device including the sets of battery cells and at least one capacitor. The battery management circuit includes: a positive connection terminal to be connected to a positive electrode of a corresponding one of the sets of the battery cells; a negative connection terminal to be connected to a negative electrode of the corresponding one of the sets of the battery cells; a capacitor connection terminal to be connected to a terminal of the at least one capacitor; and a control circuit that controls a connection operation of connecting the positive connection terminal or the negative connection terminal to the capacitor connection terminal, and causes the battery management circuit to perform the connection operation in synchronization with a connection operation of another battery management circuit among battery management circuits each of which is the battery management circuit.

An energy storage device according to an aspect of the present disclosure for solving the above problem includes the above-described battery management circuit, the above-described at least one capacitor, and the above-described sets of battery cells. A battery management method according to an aspect of the present disclosure for solving the above problem is a battery management method to be performed by a battery management circuit provided for each of sets of battery cells connected in series in an energy storage device including the sets of the battery cells and at least one capacitor. The battery management circuit includes: a positive connection terminal to be connected to a positive electrode of a corresponding one of the sets of the battery cells; a negative connection terminal to be connected to a negative electrode of the corresponding one of the sets of the battery cells; a capacitor connection terminal to be connected to a terminal of the at least one capacitor; and a control circuit that controls a connection operation of connecting the positive connection terminal or the negative connection terminal to the capacitor connection terminal. The battery management method includes: determining whether a connection operation in a battery management circuit for another one of the sets of the battery cells is turned off; and performing a new connection operation when it is determined that the connection operation in the battery management circuit for the other one of the sets of the battery cells is turned off.

Advantageous Effects

With the battery management circuit, the energy storage device, and the battery management method according to an aspect of the present disclosure, it is possible to reduce a power loss in voltage balancing.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT (Underlying Knowledge Forming Basis of the Present Disclosure)

The inventors have found the following problem regarding an energy storage device that performs the voltage balancing process mentioned in the section of "Background".

(Underlying Knowledge Forming Basis of the Present Disclosure)

The inventors have found the following problem related to the technique of balancing the voltages of battery cells in sets of battery cells which is mentioned in the section of "Background".

First, the voltage balancing according to PTL 1 will be described.

Figure 1:
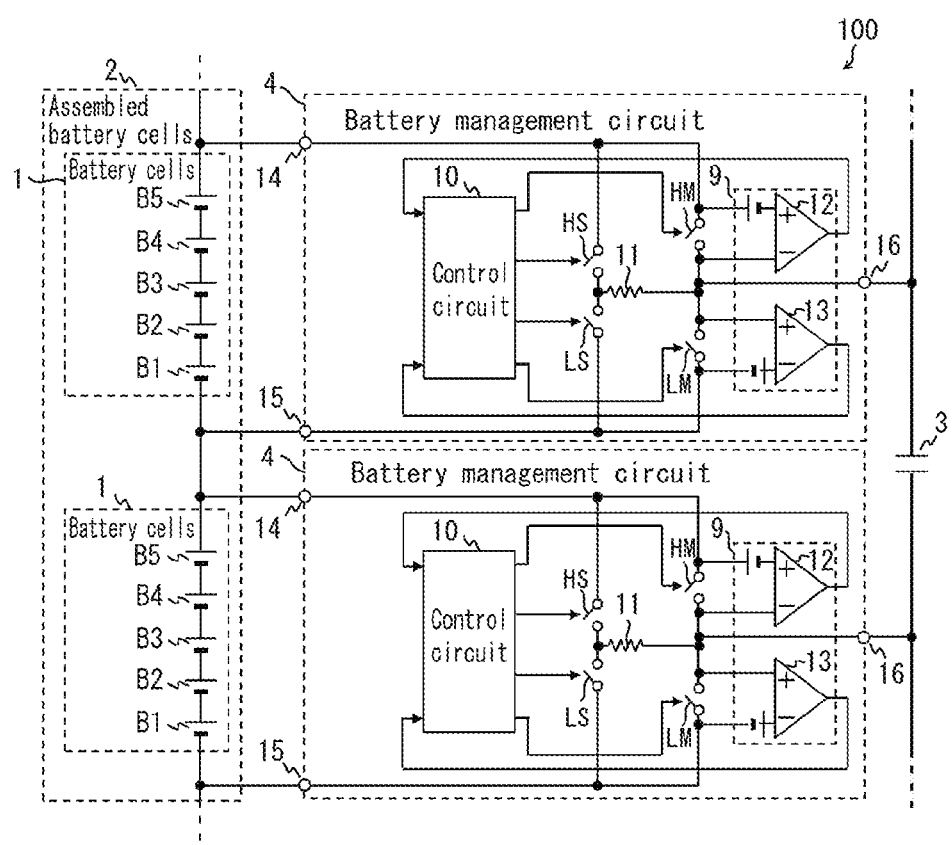
FIG. 1 is a circuit diagram illustrating an example of the configuration of an energy storage device according to an embodiment of the present disclosure.
Figure 7:
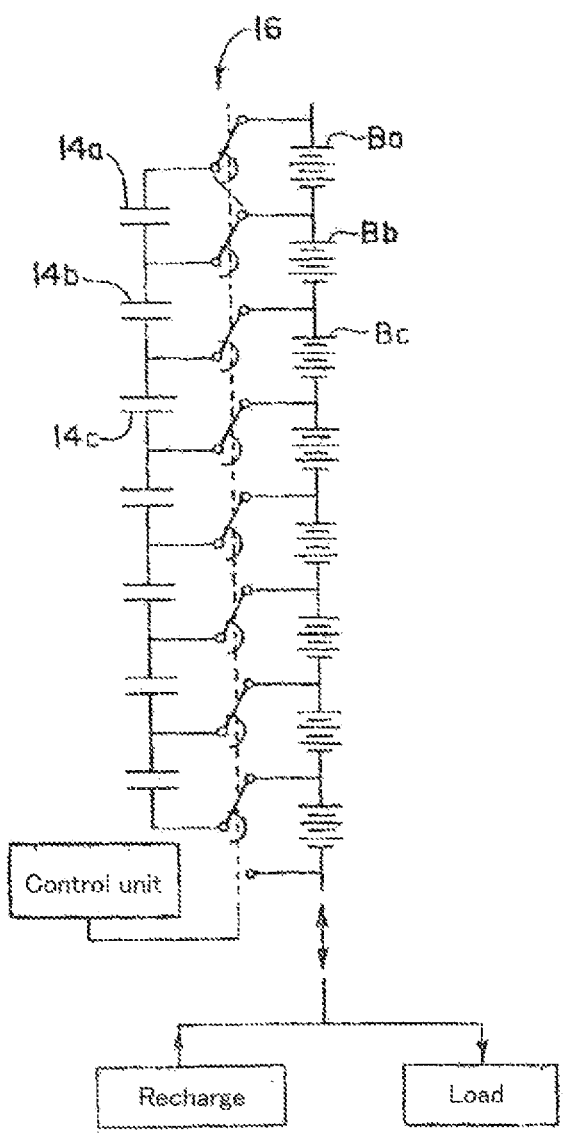
FIG. 7 is a circuit diagram illustrating a device that performs voltage balancing according to PTL 1.

FIG. 7 is a diagram disclosed as FIG. 1 of PTL 1 and is a circuit diagram illustrating a device that performs voltage balancing. The device illustrated in the diagram connects each of capacitors to a different one of sets of battery cells and subsequently connects each capacitor to another different one of the sets of battery cells. The device repeatedly switches between the connections to balance the output voltages of the sets of battery cells.

According to PTL 1, however, the device has a problem that a great power loss may occur in the voltage balancing operation. The problem will be described with reference to FIG. 8 and FIG. 9.

Figure 2:
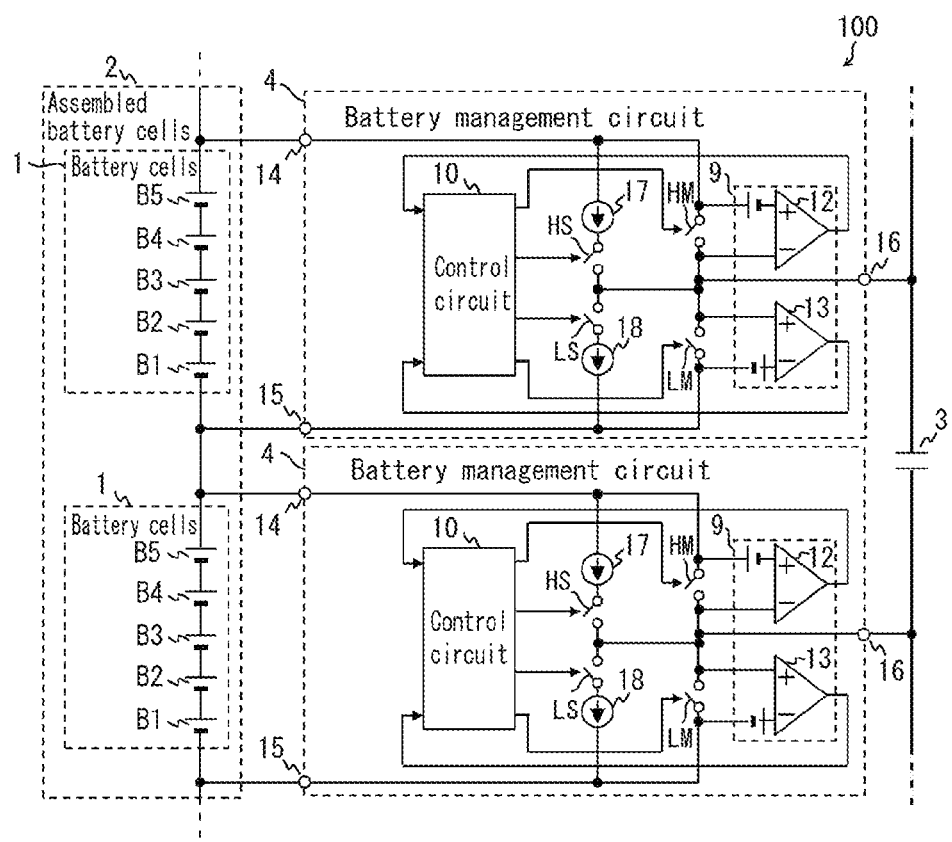
FIG. 2 is a circuit diagram illustrating another example of the configuration of the energy storage device according to the embodiment.
Figure 8:
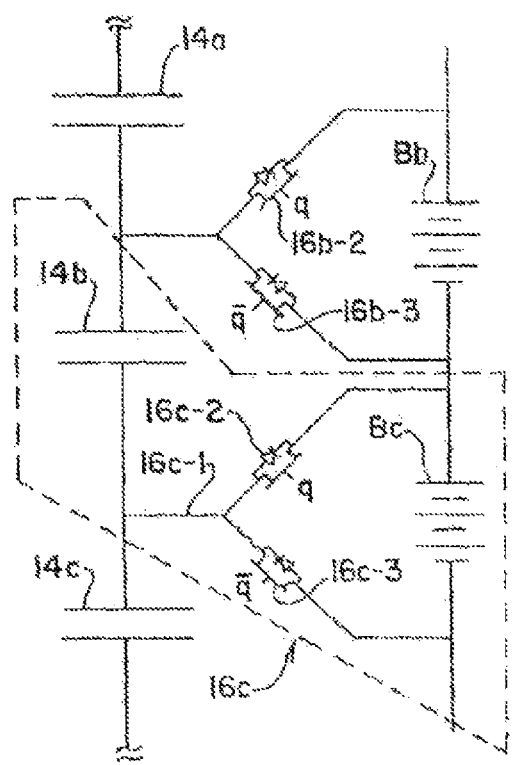
FIG. 8 is a circuit diagram illustrating the details of part of the device illustrated in FIG. 7.

FIG. 8 is a diagram disclosed as FIG. 2 of PTL 1 and is a circuit diagram illustrating the details of part of the device illustrated in FIG. 7. In FIG. 8, switches 16*b*-2 and 16*c*-2 are turned on and off according to gate signal q. Switches 16*b*-3 and 16*c*-3 are turned on and off according to the inverted signal of gate signal q. Accordingly, switches 16*b*-2 and 16*c*-2 are in an ON state exclusively against switches 16*b*-3 and 16*c*-3. For example, since a voltage between the terminals of capacitor 14*b* is present only in a period during which the output voltage of battery cell Bb or the output voltage of battery cell Bc is applied, an amount of change in the voltage is small and there should be no unnecessary current flowing to the capacitor.

However, with signal transmission lines for transmitting gate signals q and the inverted signals of gate signals q to the switches, variance in delay times of the gate signals for the switches easily occurs due to variation in potential differences among the power supplies of the switches, and the switching timings of the switches may not be same. A problem is that a power loss may occur due to variance in the switching timings of the switches.

Figure 9:
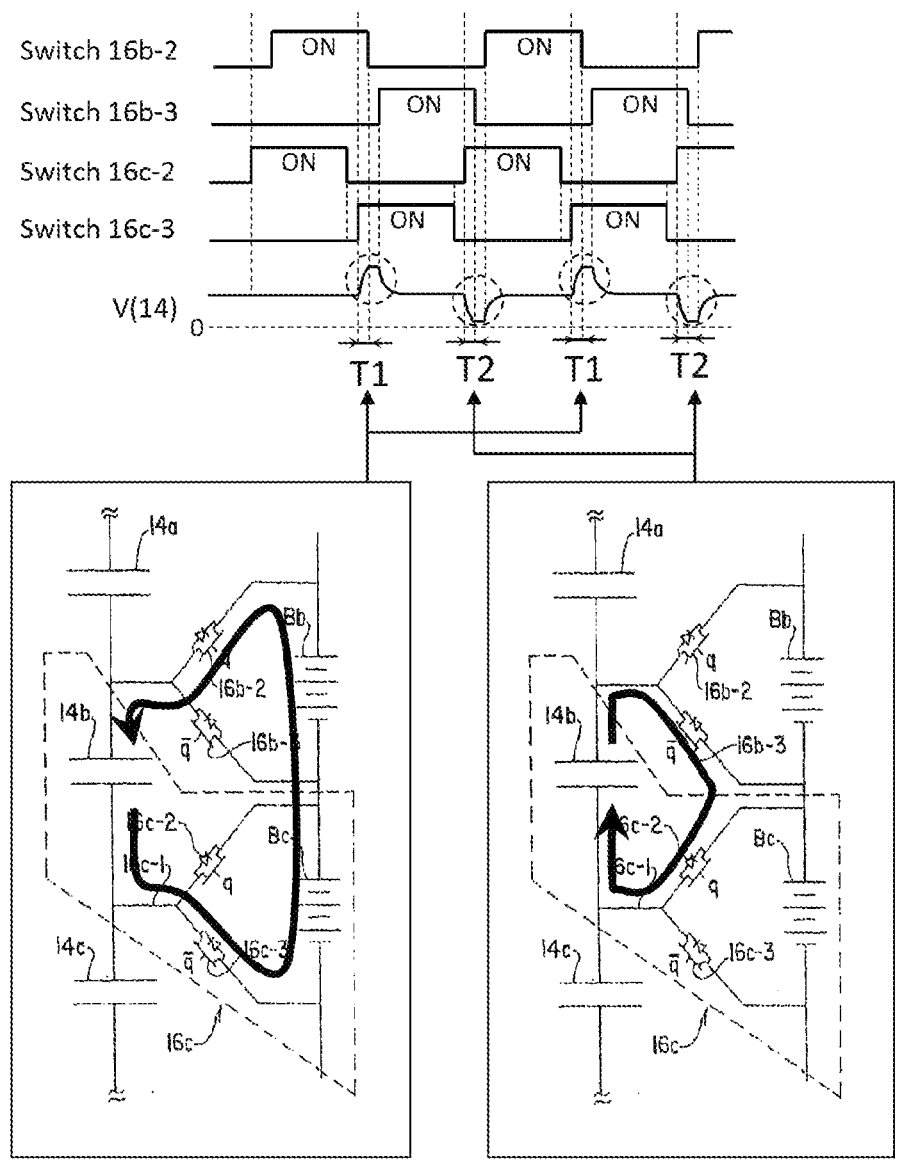
FIG. 9 is a diagram illustrating a case where a power loss occurs due to variance in the switching timings of switches.

FIG. 9 is a diagram illustrating a case where a power loss occurs due to variance in the switching timings of switches. The upper portion in FIG. 9 illustrates the timings at which switches 16*b*-2, 16*b*-3, 16*c*-2, and 16*c*-3 are turned on and off (gate signals), and a voltage change in capacitor 14*b*. The lower left part in FIG. 9 illustrates a voltage to be applied to capacitor 14*b* in section T1 in the upper part. The lower right part in FIG. 9 illustrates a voltage to be applied to capacitor 14*b* in section T2 in the upper part.

The time chart shown in the upper part in FIG. 9 illustrates an example in which the on/off timings of switch 16*b*-2 and switch 16*b*-3 are more delayed than the on/off timings of switch 16*c*-2 and switch 16*c*-3, respectively, and the on/off timings overlap each other between switches 16*b*-2, 16*b*-3 and switches 16*c*-2, 16*c*-3. In other words, switch 16*b*-2 and switch 16*c*-3 are in the ON state at the same time in section T1, and switch 16*b*-3 and switch 16*c*-2 are in the ON state at the same time in section T2.

In section T1, the voltage of the series connection of battery cells Bb and Bc is applied between the terminals of capacitor 14*b*. In section T2, both of the terminals of capacitor 14*b* are short-circuited. As illustrated in each of the dotted circles in the upper part of the diagram, the voltage applied to capacitor 14*b* changes greatly. Due to such voltage change, an unnecessary amount of current flows to capacitor 14*b* and a great power loss occurs, as indicated by the thick arrows in the lower part of the diagram.

Thus, the problem is that a great power loss may occur due to variance in the switching timings of switches.

In view of the above, the present disclosure provides a battery management circuit, an energy storage device, and a battery management method that reduce a power loss in voltage balancing.

A battery management circuit according to an aspect of the present disclosure for solving the above problem is a battery management circuit provided for each of sets of battery cells connected in series in an energy storage device including the sets of the battery cells and at least one capacitor. The battery management circuit includes: a positive connection terminal to be connected to a positive electrode of a corresponding one of the sets of the battery cells; a negative connection terminal to be connected to a negative electrode of the corresponding one of the sets of the battery cells; a capacitor connection terminal to be connected to a terminal of the at least one capacitor; and a control circuit that controls a connection operation of connecting the positive connection terminal or the negative connection terminal to the capacitor connection terminal, and causes the battery management circuit to perform the connection operation in synchronization with a connection operation of another battery management circuit among battery management circuits each of which is the battery management circuit.

An energy storage device according to an aspect of the present disclosure for solving the above problem includes: the above-described battery management circuit; the above-described at least one capacitor; and the above-described sets of the battery cells.

A battery management method according to an aspect of the present disclosure for solving the above problem is a battery management method to be performed by a battery management circuit provided for each of sets of battery cells connected in series in an energy storage device including the sets of the battery cells and at least one capacitor. The battery management circuit includes: a positive connection terminal to be connected to a positive electrode of a corresponding one of the sets of the battery cells; a negative connection terminal to be connected to a negative electrode of the corresponding one of the sets of the battery cells; a capacitor connection terminal to be connected to a terminal of the at least one capacitor; and a control circuit that controls a connection operation of connecting the positive connection terminal or the negative connection terminal to the capacitor connection terminal. The battery management method includes: determining whether a connection operation in a battery management circuit for another one of the sets of the battery cells is turned off; and performing a new connection operation when it is determined that the connection operation in the battery management circuit for the other one of the sets of the battery cells is turned off.

Hereinafter, an embodiment of the present disclosure will be described with reference to the drawings. Note that the embodiment describes a general or specific example of the present disclosure. The elements, the arrangement and connection of the elements, driving timings, etc. described in the following embodiment are mere examples, and are not intended to limit the present disclosure. The embodiment of the present disclosure should not be limited to the current independent claims, and may be represented by other independent claims.

The drawings are not necessarily accurate illustrations. Duplicated description of substantially identical elements in the drawings may be omitted or simplified.

Embodiment

FIG. 1 is a circuit diagram illustrating an example of the configuration of energy storage device 100 according to an embodiment of the present disclosure.

In the diagram, energy storage device 100 includes assembled battery cells 2, capacitor 3, and battery management circuits 4.

Assembled battery cells 2 include sets of battery cells 1 connected in series. Each of the sets of battery cells 1 includes battery cells B1 to B5. Each battery cell may be, for example, a lithium-ion battery, but may be another type of battery such as a nickel metal hydride battery. Moreover, each battery cell may be a series-connected energy storage cell such as a lithium-ion capacitor. Assembled battery cells 2 are connected to a load and a charging circuit. The load is, for example, the motor of an HEV or an EV, but is not limited to such examples. FIG. 1 illustrates an example in which a set of battery cells 1 includes five battery cells B1 to B5, but the number of battery cells composing a set of battery cells 1 needs to be at least one. The number of sets of battery cells 1 composing assembled battery cells 2 is same as the number of battery management circuits 4.

The number of capacitors 3 is less than the number of sets of battery cells 1 by one. In other words, if the number of sets of battery cells 1 is n, the number of capacitors 3 is (n−1). Each of capacitors 3 is used in a voltage balancing process of balancing the output voltages of the sets of battery cells 1. In the voltage balancing process, each capacitor 3 is connected in parallel to a different one of the sets of battery cells 1, and is then connected in parallel to another different one of the sets of battery cells 1. By alternately repeating these two types of parallel connections, the output voltages of the sets of battery cells 1 are balanced.

Battery management circuit 4 is provided for each of sets of battery cells 1. Each of battery management circuits 4 manages a corresponding one of the sets of battery cells 1. In the voltage balancing process, battery management circuit 4 controls switching between the two types of parallel connections described above. In the operation of switching between the parallel connections, battery management circuit 4 is configured to perform a connection operation in synchronization with the connection operation of another battery management circuit 4 among battery management circuits 4.

For such a configuration, each of battery management circuits 4 includes positive connection terminal 14, negative connection terminal 15, capacitor connection terminal 16, first main switch HM, first sub switch HS, second main switch LM, second sub switch LS, detector 9, control circuit 10, and resistive element 11.

Positive connection terminal 14 is a terminal to be connected to the positive electrode of one of the sets of battery cells 1 corresponding to battery management circuit 4.

Negative connection terminal 15 is a terminal to be connected to the negative electrode of the aforementioned one of the sets of battery cells 1 corresponding to battery management circuit 4.

Capacitor connection terminal 16 is a terminal to be connected to a terminal of capacitor 3. Specifically, when the number of capacitors 3 is one, capacitor connection terminal 16 is connected to one of terminals of capacitor 3, and when the number of capacitors 3 is plural, capacitor connection terminal 16 is connected to the connection point of two capacitors 3 among capacitors 3 connected in series or to one of terminals of one of capacitors 3 at both ends.

First main switch HM is a switch that connects, as a high-side main switch, positive connection terminal 14 and capacitor connection terminal 16.

Second main switch LM connects, as a low-side main switch, negative connection terminal 15 and capacitor connection terminal 16.

First sub switch HS is a switch for forming, as a high-side sub switch, a first path in which a potential difference is generated by a current flowing from positive connection terminal 14 to capacitor connection terminal 16. The first path is a path that connects positive connection terminal 14, first sub switch HS, resistive element 11, and capacitor connection terminal 16.

Second sub switch LS is a switch for forming, as a low-side sub switch, a second path in which a potential difference is generated by a current flowing from capacitor connection terminal 16 to negative connection terminal 15. The second path is a path that connects negative connection terminal 15, second sub switch LS, resistive element 11, and capacitor connection terminal 16.

Detector 9 detects, as a potential difference in the first path, the potential difference between capacitor connection terminal 16 and positive connection terminal 14. The potential difference in the first path is detected as a voltage fall generated at the both ends of a series circuit including the internal resistance (on-resistance) of first sub switch HS and resistive element 11.

Detector 9 also detects, as a potential difference in the second path, the potential difference between capacitor connection terminal 16 and negative connection terminal 15. The potential difference in the second path is detected as a voltage fall generated at the both ends of a series circuit including the internal resistance (on-resistance) of second sub switch LS and resistive element 11. Note that when the on-resistance of first sub switch HS or the on-resistance of second sub switch LS is low enough to be ignored, the potential difference in the first path or the potential difference in the second path is detected as the voltage fall of resistive element 11. It should be also noted that when the on-resistance of first sub switch HS or the on-resistance of second sub switch LS is sufficiently high, resistive element 11 may be omitted.

More specifically, detector 9 includes comparator 12 and comparator 13.

Comparator 12 determines whether a potential difference in the first path is less than or equal to predetermined value th1. Predetermined value th1 is set based on the reference voltage supply of the plus input terminal of comparator 12. The determination performed by comparator 12 means determining whether the connection operation (first main switch HM) of another battery management circuit 4 is turned off.

Comparator 13 determines whether a potential difference in the second path is greater than or equal to predetermined value th5. Predetermined value th5 is set based on the reference voltage supply of the minus input terminal of comparator 13. The determination performed by comparator 13 means determining whether the connection operation (second main switch LM) of another battery management circuit 4 is turned off.

Resistive element 11 is a resistive element for the detection of a potential difference in the first path and a potential difference in the second path. Resistive element 11 is shared between the first path and the second path.

In the voltage balancing process, control circuit 10 controls a connection operation of connecting capacitor connection terminal 16 and positive connection terminal 14 or negative connection terminal 15. There are two types of connection operations. One is a connection operation of connecting positive connection terminal 14 and capacitor connection terminal 16 by first main switch HM. The other is a connection operation of connecting negative connection terminal 15 and capacitor connection terminal 16 by second main switch LM. The two types of connection operations correspond to the aforementioned two types of parallel connections for connecting the sets of battery cells 1 and capacitors 3.

Control circuit 10 performs a connection operation in synchronization with the connection operation of another battery management circuit 4 among battery management circuits 4. For example, control circuit 10 performs the connection operation in synchronization with the connection operation of another battery management circuit 4, using the result of the detection by detector 9. Specifically, control circuit 10 determines whether the connection operation of another battery management circuit 4 is turned off, based on a potential difference detected by detector 9, and causes battery management circuit 4 to perform a new connection operation when it is determined that the connection operation of another battery management circuit 4 is turned off.

To be more specific, regarding the high side, control circuit 10 turns on first main switch HM after detector 9 detects that a potential difference in the first path rises to a predetermined value within a first period after first sub switch HS is turned on. Regarding the low side, control circuit 10 turns on second main switch LM after detector 9 detects that a potential difference in the second path falls to a predetermined value within a second period after second sub switch LS is turned on.

Note that another battery management circuit 4 mentioned above refers to battery management circuit 4 corresponding to any one of the sets of battery cells 1 other than a set of battery cells 1 corresponding to one battery management circuit 4 in energy storage device 100. Another battery management circuit 4 may be, for example, adjacent battery management circuit 4 located on the plus side (high side) or the minus side (low side) of the set of battery cells 1 corresponding to that one battery management circuit 4 among the sets of battery cells 1 connected in series.

Thus, control circuit 10 of battery management circuit 4 or control circuit 10 of another battery management circuit 4 performs control to balance the voltages of the sets of battery cells 1 by repeatedly switching between a first connection state of connecting capacitor 3 to a first set of battery cells 1 in parallel and a second connection state of connecting capacitor 3 to a second set of battery cells 1 in parallel, while performing the switching operation in synchronization with control circuit 10 in another battery management circuit 4, using first sub switch HS, second sub switch LS, and detector 9 in battery management circuit 4.

In FIG. 1, each of control circuits 10 corresponds to a different one of the sets of battery cells 1, and a switch group provided for each of the sets of battery cells 1 is controlled by control circuit 10. Note that the switch group includes first main switch HM, second main switch LM, first sub switch HS, and second sub switch LS. FIG. 1, as compared to FIG. 7 illustrating the conventional technology, does not include signal transmission lines, which are present in FIG. 7, for transmitting an instruction from one control unit to each of the switches (signal lines for gate signals q 1 and signal lines for the inverted signals of gate signals q). Thus, each of control circuits 10 and the corresponding switches belong to a corresponding one of battery management circuits 4 in which control circuit 10 and the switches share one set of battery cells 1 as a power supply, and therefore, a difference in delay time is less apt to occur. Accordingly, it is possible to reduce a power loss due to different switching timings between battery management circuits 4.

Note that each of battery management circuits 4 in FIG. 1 may be configured as an integrated circuit (IC). One battery management circuit 4 and one capacitor 3 may be configured as a printed circuit board. Moreover, battery management circuit 4 may measure the output voltage of the corresponding set of battery cells 1. Furthermore, battery management circuit 4 may measure the temperature of the corresponding set of battery cells 1. Battery management circuit 4 may correct a measured voltage based on a measured temperature. Alternatively, battery management circuit 4 may measure a current flowing through the set of battery cells 1.

Next, an example of a method for individual control circuit 10 prepared for each of sets of battery cells 1 to perform switching in synchronization with another control circuit 10, without any signal transmission lines for either one of control circuits 10 will be described.

In the configuration example of energy storage device 100 illustrated in FIG. 1, control circuit 10 turns on first main switch HM for a predetermined period of time after detector 9 detects that the voltage of capacitor connection terminal 16 rises to a predetermined value within a predetermined period after first sub switch HS is turned on. Subsequently, control circuit 10 turns on second main switch LM for a predetermined period of time after detector 9 detects that the voltage of capacitor connection terminal 16 falls to a predetermined value within a predetermined period after second sub switch LS is turned on. Control circuit 10 repeatedly operates such a sequence of processes in a control procedure.

Each of control circuits 10 performs the same control procedure.

The operation of the circuit illustrated in FIG. 1 in the sequence of processes in the control procedure will be described more in detail.

In one control circuit 10, when first sub switch HS is turned on after second main switch LM is turned on and then turned off after a predetermined period of time has elapsed, a current flows from positive connection terminal 14 to capacitor connection terminal 16 via resistive element 11. Also, in another control circuit 10 in battery management circuit 4 adjacent to battery management circuit 4 of that one control circuit 10, when first sub switch HS is turned on after second main switch LM is turned off, a current flows from positive connection terminal 14 to capacitor connection terminal 16 via resistive element 11.

After this, if the timings at which the first sub switches HS are turned on are same in the two neighboring control circuits 10, the voltage of capacitor connection terminal 16 rises quickly. However, if the timings of first sub switches HS are not same, with one of first sub switches HS being turned on earlier than the other that is still OFF and second main switch LM is still ON, the voltage of capacitor connection terminal 16 on the side of first sub switch HS that is turned on earlier stays the same for a while without rising. This is because it takes a long time for the voltage to rise based on a time constant determined by a product of the resistance value of resistive element 11 and the capacitance value of capacitor 3.

After that, when the other second main switch LM is turned off and first sub switches HS in the neighboring battery management circuits 4 are both turned on, both of the terminals of capacitor 3 have high impedance, and therefore, the voltage rises quickly. Then, first main switch HM is turned on after detector 9 detects that a potential difference between capacitor connection terminal 16 and positive connection terminal 14 or between capacitor connection terminal 16 and negative connection terminal 15 rises to a predetermined value. Accordingly, the timings at which first main switches HM in the neighboring battery management circuits 4 are turned on are same. Even if a slight difference is generated between the timings at which first main switches HM are turned on, a current of great magnitude will not flow through the circuit since the impedances of the capacitor terminals in the previous state are high.

Subsequently, when second sub switch LS is turned on after first main switch HM is turned on and then turned off after a predetermined period of time has elapsed in one control circuit 10, a current flows from capacitor connection terminal 16 to negative connection terminal 15 via resistive element 11. Also, in control circuit 10 in battery management circuit 4 adjacent to battery management circuit 4 of that one control circuit 10, when second sub switch LS is turned on after first main switch HM is turned off, a current flows from capacitor connection terminal 16 to negative connection terminal 15 via resistive element 11.

After this, if the timings at which second sub switches LS are turned on are same in the two neighboring control circuits 10, the voltage of capacitor connection terminal 16 falls quickly. However, if the timings of second sub switches LS are not same, with one of second sub switches LS being turned on earlier than the other that is still OFF and first main switch HM is still ON, the voltage of capacitor connection terminal 16 on the side of second sub switch LS that is turned on earlier stays the same for a while without falling. This is because it takes a long time for the voltage to fall based on a time constant determined by a product of the resistance value of resistive element 11 and the capacitance value of capacitor 3. After that, when the other first main switch HM is turned off and second sub switches LS in the neighboring battery management circuits 4 are both turned on, both of the terminals of capacitor 3 have high impedance, and therefore, the voltage falls quickly. Then, second main switch LM is turned on after detector 9 detects that a potential difference between capacitor connection terminal 16 and positive connection terminal 14 or between capacitor connection terminal 16 and negative connection terminal 15 falls to a predetermined value. Accordingly, the timings at which second main switches LM in the neighboring battery management circuits 4 are turned on are same. Even if a slight difference is generated between the timings at which second main switches LM are turned on, a current of great magnitude will not flow through the circuit since the impedances of the capacitor terminals in the previous state are high.

The ON times of the first or second main switch for control circuits 10 in neighboring battery management circuits 4 do not need to coincide. In other words, a time period during which first main switch HM in one battery management circuit 4 is ON and a time period during which first main switch HM in battery management circuit 4 adjacent to that one battery management circuit 4 is ON do not need to coincide. Likewise, a time period during which second main switch LM in that one battery management circuit 4 is ON and a time period during which second main switch LM in that adjacent battery management circuit 4 is ON do not need to coincide. This is because after having been switched to a state in which first sub switch HS is ON or a state in which second sub switch LS is ON, battery management circuit 4 having a main switch with a shorter ON time waits until battery management circuit 4 having a main switch with a longer ON time is switched to the state in which first sub switch HS is ON or the state in which second sub switch LS is ON.

With the use of such a control method, it is possible for control circuits 10 to turn on main switches at the same timing via capacitors for voltage balancing, thereby enabling switching synchronization without any other signal transmission lines.

Next, another example of the configuration of energy storage device 100 will be described.

FIG. 2 is a circuit diagram illustrating another example of the configuration of energy storage device 100 according to the embodiment. In FIG. 1, battery management circuit 4, with the use of resistive element 11, generates a potential difference by a current flowing from positive connection terminal 14 to capacitor connection terminal 16 and also generates a potential difference by a current flowing from capacitor connection terminal 16 to negative connection terminal 15. In contrast, battery management circuit 4 in FIG. 2 is configured to generate a potential difference corresponding to the voltage of capacitor connection terminal 16, using current source 17 and current source 18.

In the case where battery management circuit 4 is configured as a semiconductor integrated circuit, it is easy to include current source 17 and current source 18 in battery management circuit 4.

Since the roles of the other portions and a control method are the same as those described with reference to FIG. 1, descriptions are omitted.

Next, yet another example of the configuration of energy storage device 100 will be described.

Figure 3:
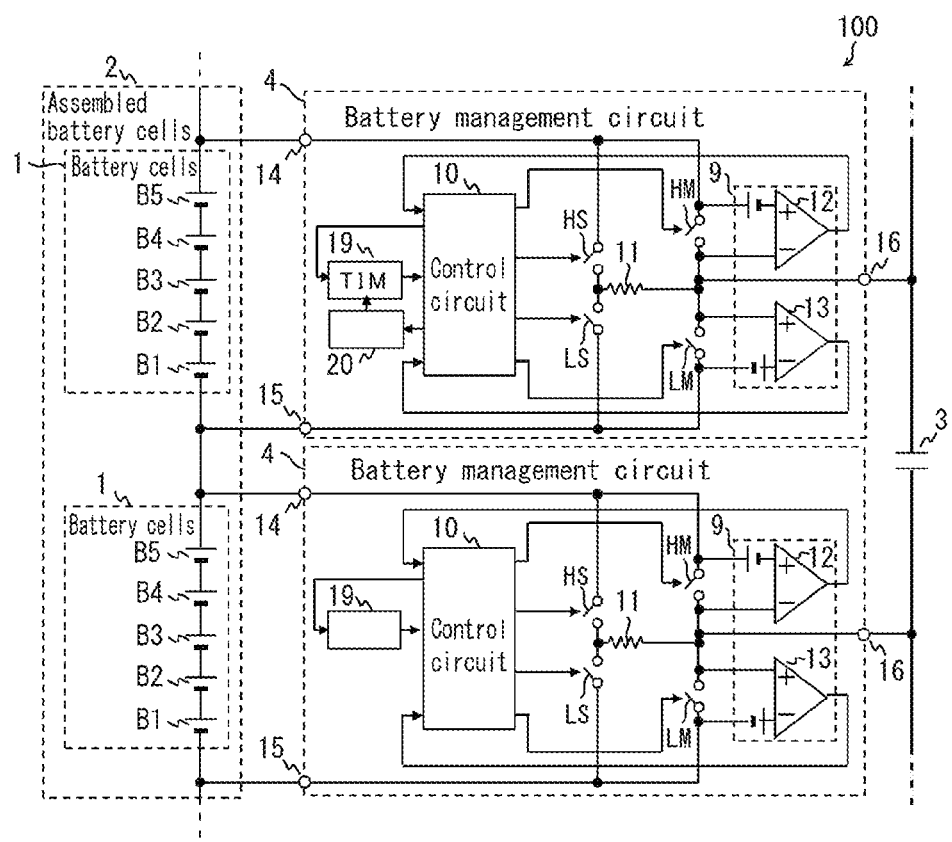
FIG. 3 is a circuit diagram illustrating yet another example of the configuration of the energy storage device according to the embodiment.

FIG. 3 is a circuit diagram illustrating yet another example of the configuration of energy storage device 100 according to the embodiment.

In FIG. 1, control circuit 10 determines the ON times of main switches, that is, first main switch HM and second main switch LM, whereas in FIG. 3, timer circuit 19 in charge of the ON times of the main switches is added.

As described above, the ON times of the first or second main switch do not need to coincide between control circuits 10. After first sub switch HS or second sub switch LS is switched to an ON state, battery management circuit 4 having a main switch with a shorter ON time waits until battery management circuit 4 having a main switch with a longer ON time is switched to a state in which first sub switch HS or second sub switch LS is ON. Accordingly, even if the ON times of the first or second main switch do not coincide, an excessive amount of current will not flow through the circuit. However, during a period of the state in which one of the main switches waits the other as described above, efficiency decreases since an unnecessary amount of current flows although the amount is small. In addition, since the period is ineffective for cell voltage balancing, the longer the period is, the longer time it takes for cell voltage balancing. Accordingly, the shorter the period during which one of the main switches waits for the other is, the better. In other words, it is ideal that the ON times of the main switches be equal between battery management circuits 4.

In FIG. 3, timer control circuit 20 is provided at least for timer circuit 19 in battery management circuit 4 that adjusts to the switching timing of another battery management circuit 4 among battery management circuits 4, so that a time period during which first main switch HM or second main switch LM is ON is less than or equal to a predetermined value. Thus, a time set by timer circuit 19 is automatically adjusted.

As a specific example, timer control circuit 20 can be configured by a circuit that transforms a signal indicating a time period during which first sub switch HS is ON and a time period during which second sub switch LS is ON into a signal that is averaged using an integrator circuit. Timer circuit 19 can be configured by a circuit that makes an ON time longer according to the voltage of the control terminal of timer control circuit 20.

With the circuit as described above, the ON times of the main switches in battery management circuits 4 associated with the corresponding sets of battery cells 1 are equal, and it is thus possible to configure an energy storage device with less power loss and a shorter time required for cell voltage balancing.

FIG. 1 through FIG. 3 each has illustrated the case where assembled battery cells include two sets of battery cells 1, but the number of sets of battery cells 1 may be two or any number greater than two.

Figure 4:
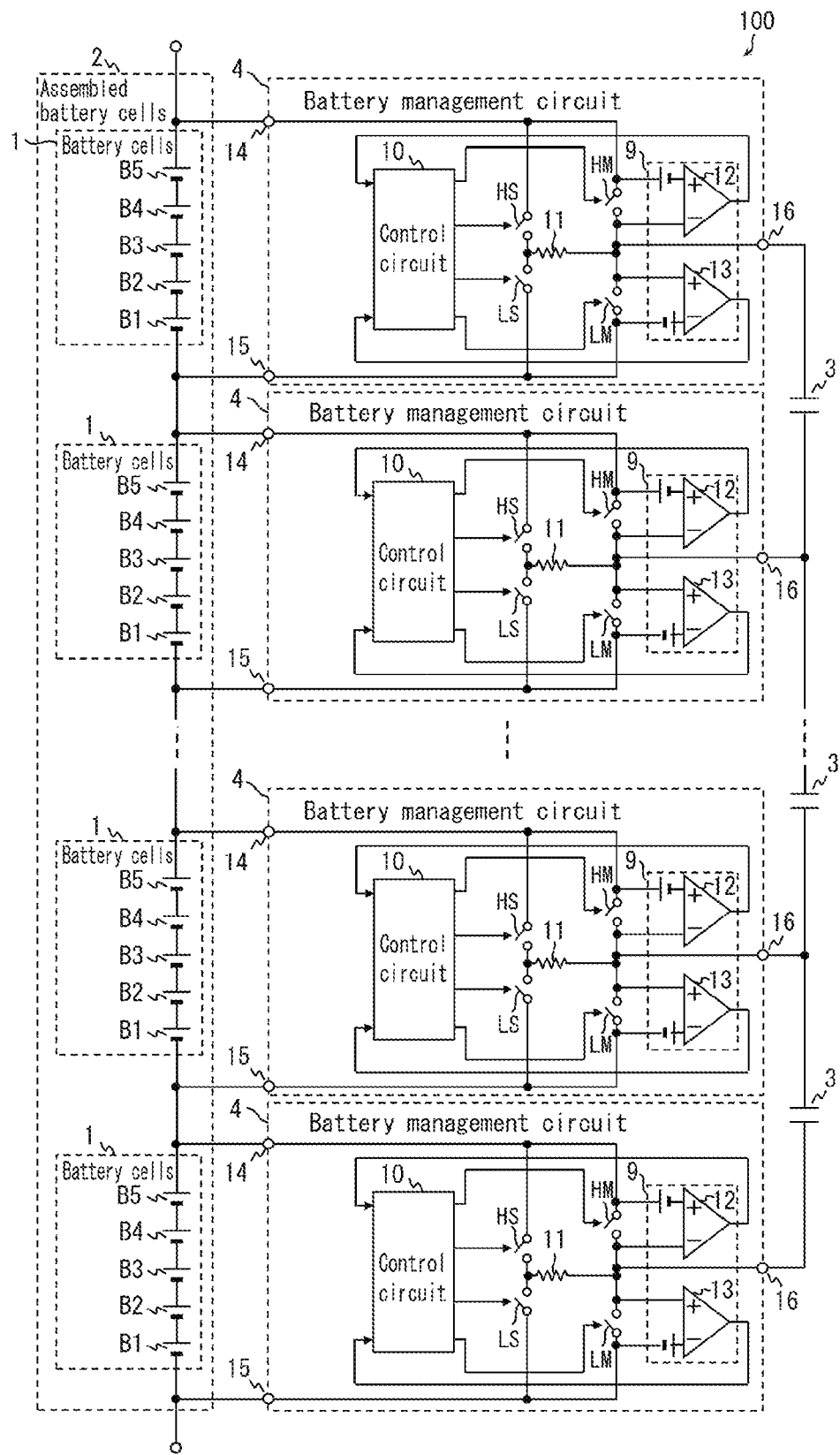
FIG. 4 is a circuit diagram illustrating an example of the configuration of the energy storage device, according to the embodiment, which includes three or more sets of battery cells.

FIG. 4 is a circuit diagram illustrating an example of the configuration of energy storage device 100 according to the embodiment. In the example, the number of sets of battery cells 1 is three or more. Although the diagram shows the case where each of the sets of battery cells 1 includes five unit cells, the number of unit cells embedded in a set of battery cells 1 may be any number including one.

An example in which individual control circuit 10 prepared for each of three or more sets of battery cells 1 performs switching in synchronization with another control circuit 10, without any signal transmission lines provided for either one of control circuits 10 will be described with reference to FIG. 4. In FIG. 4, the number of sets of battery cells 1 and the number of battery management circuits 4 are the same. The number of capacitors 3 is less than the number of sets of battery cells 1 by one.

In the configuration example of energy storage device 100 illustrated in FIG. 4, control circuit 10 turns on first main switch HM for a predetermined period of time after detector 9 detects that the voltage of capacitor connection terminal 16 rises to a predetermined value within a predetermined period after first sub switch HS is turned on. Subsequently, control circuit 10 turns on second main switch LM for a predetermined period of time after detector 9 detects that the voltage of capacitor connection terminal 16 falls to a predetermined value within a predetermined period after second sub switch LS is turned on. Control circuit 10 repeats such a sequence of processes in a control procedure.

Other control circuits 10 in battery management circuits 4 perform the same control procedure.

The operation of the entire circuit illustrated in FIG. 4 in the sequence of processes in the control procedure will be described in detail.

After switching second main switch LM from an ON state to an OFF state, each of control circuits 10 turns on first sub switch HS to allow a positive current to flow to capacitor connection terminal 16, and waits until the voltage of capacitor connection terminal 16 rises to a predetermined value. When any one of second main switches LM in battery management circuits 4 is ON, the voltage of capacitor connection terminal 16 is held for a while, and when all of second main switches LM are turned off, the voltage of capacitor connection terminal 16 rises rapidly. After detector 9 detects that a potential difference between capacitor connection terminal 16 and positive connection terminal 14 or between capacitor connection terminal 16 and negative connection terminal 15 rises to a predetermined value, first main switch HM is turned on. Accordingly, the timings at which first main switches HM in battery management circuits 4 are turned on are same. Even if the timings are more or less different, a current of great magnitude will not flow through the circuit since the impedances of the capacitor terminals in the previous state are high.

Subsequently, after turning on and then switching off first main switch HM after a predetermined time has elapsed, control circuit 10 turns on second sub switch LS to allow a negative current to flow to capacitor connection terminal 16, and waits until the voltage of capacitor connection terminal 16 falls to a predetermined value. When any one of first main switches HM in battery management circuits 4 is ON, the voltage of capacitor connection terminal 16 is held for a while, and when all of first main switches HM are turned off, the voltage of capacitor connection terminal 16 falls rapidly. After detector 9 detects that a potential difference between capacitor connection terminal 16 and positive connection terminal 14 or between capacitor connection terminal 16 and negative connection terminal 15 falls to a predetermined value, second main switch LM is turned on. Accordingly, the timings at which second main switches LM in battery management circuits 4 are turned on are same. Even if the timings are more or less different, a current of great magnitude will not flow through the circuit since the impedances of the capacitor terminals in the previous state are high.

The ON times of the first or second main switch determined by each of control circuits 10 do not need to coincide among control circuits 10. In other words, a time period during which first main switch HM is ON or a time period during which second main switch LM is ON in one battery management circuit 4 does not need to coincide with a time period during which first main switch HM is ON or a time period during which second main switch LM is ON in another battery management circuit 4. This is because after first sub switch HS or second sub switch LS is switched to an ON state, control circuit 10 in battery management circuit 4 having a main switch with an ON time shorter than the ON time of a main switch in any other battery management circuit 4 waits until control circuit 10 in battery management circuit 4 having a main switch with an ON time that is the longest is switched to the state in which first sub switch HS is ON or the state in which second sub switch LS is ON.

Even in the case where the number of sets of battery cells 1 is three or more, it is possible, with such a control method, for control circuits 10 to turn on main switches at the same timing, thereby performing switching synchronization among all of battery management circuits 4 even without any other signal transmission lines.

Figure 5:
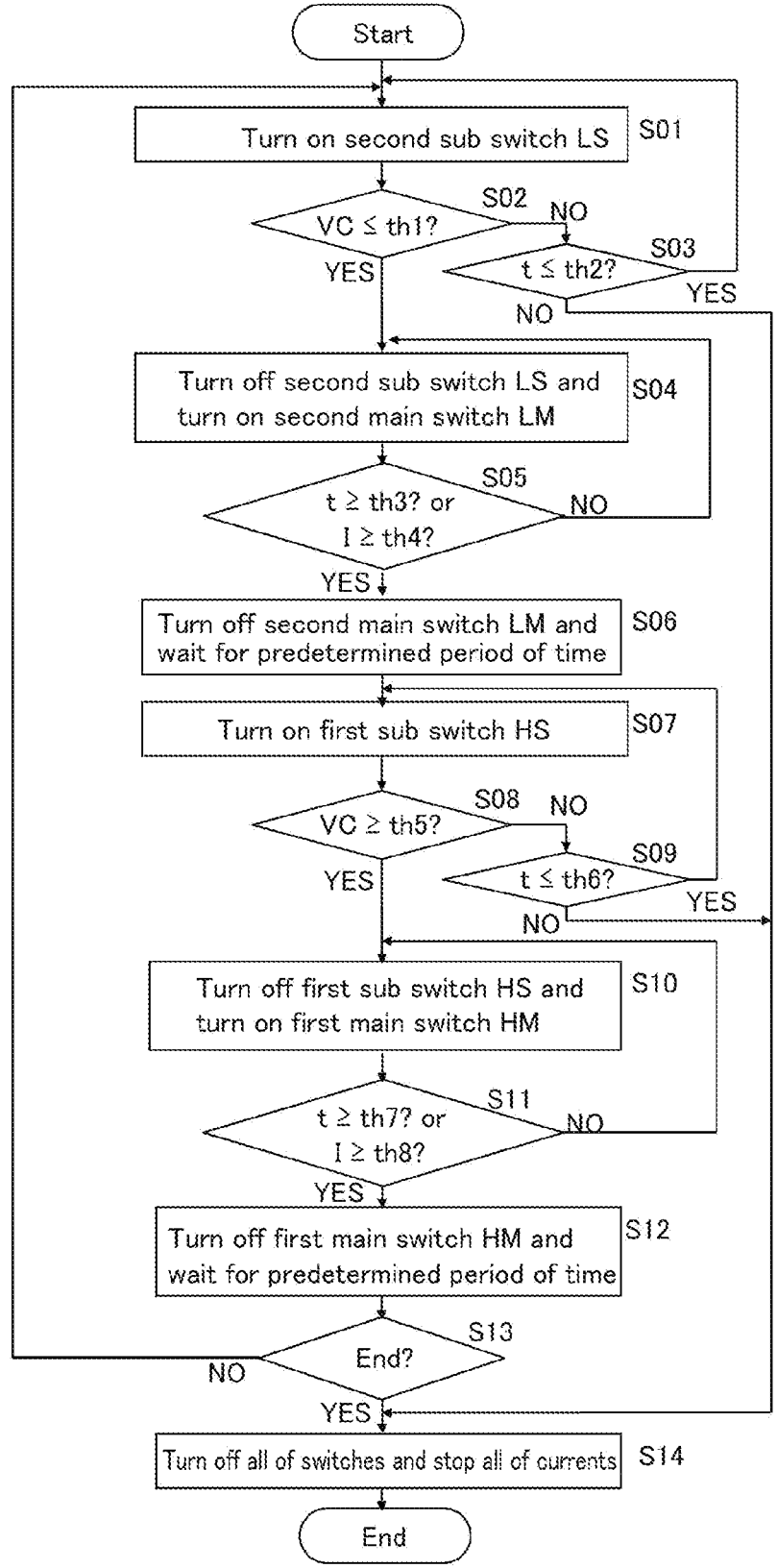
FIG. 5 is an example of a flow chart illustrating a flow of a voltage balancing process performed by the energy storage device according to the embodiment.
Figure 6:
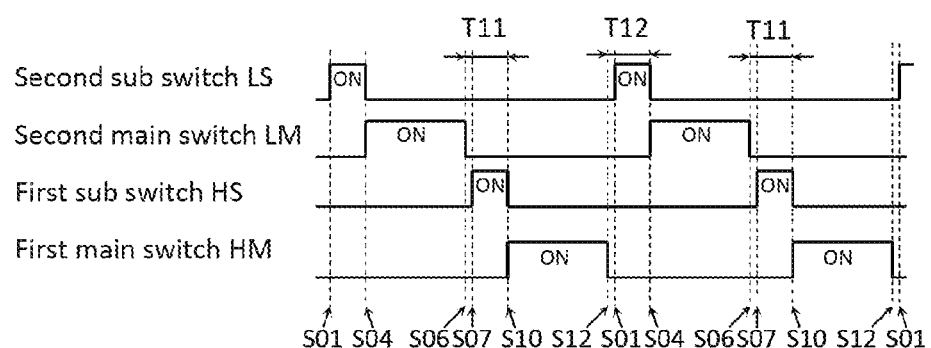
FIG. 6 shows an example of a time chart illustrating a voltage balancing process performed by a battery management circuit according to the embodiment.

Next, a flow of a process performed by control circuit 10 in the energy storage device according to the embodiment will be described with reference to FIG. 5. FIG. 5 illustrates an example of a flow chart showing a flow of a voltage balancing process performed by energy storage device 100 according to the embodiment. All of control circuits 10 that belong to battery management circuits 4 perform the same process. FIG. 6 illustrates an example of a time chart showing a voltage balancing process performed by battery management circuit 4 according to the embodiment.

In FIG. 5, a current in a first path, that is, a current flowing from positive connection terminal 14 to capacitor connection terminal 16 via first sub switch HS, is referred to as a high-side current. A current in a second path, that is, a current flowing from capacitor connection terminal 16 to negative connection terminal 15 via second sub switch LS, is referred to as a low-side current.

Control circuit 10 firstly forms a second path. In other words, control circuit 10 turns on second sub switch LS to form a path for a low-side current (S01). Subsequently, control circuit 10 determines whether voltage VC of capacitor connection terminal 16 is less than or equal to predetermined value th1 (S02). When this condition is not satisfied (S02: NO), control circuit 10 determines whether elapsed time t that elapsed after second sub switch LS is turned on is less than or equal to limit time th2 (S03). When elapsed time t is less than or equal to limit time th2 (S03: YES), control circuit 10 returns to S01. When elapsed time t exceeds limit time th2 (S03: NO), control circuit 10 turns off all of the switches and stops all of the currents (S14). When the condition is satisfied in S02 (S02: YES), control circuit 10 turns off second sub switch LS to release the second path, and turns on second main switch LM (S04). Thus, in period T12 in FIG. 6, that is, a period from a time immediately before S01 (S12) to S04, control circuit 10 determines whether the connection operations of first main switches HM in all other battery management circuits 4 are turned off, based on potential difference VC detected by detector 9. When determining that the connection operations are turned off, control circuit 10 causes battery management circuit 4 to perform a new connection operation.

Subsequently, control circuit 10 determines whether elapsed time t that elapsed after second main switch LM is turned on exceeds predetermined period th3, or whether current I flowing through second main switch LM exceeds limit current th4 (S05). When this condition is not satisfied (S05: NO), control circuit 10 returns to S04. When the condition is satisfied (S05: YES), control circuit 10 turns off second main switch LM and waits for a predetermined period of time (S06). Note that battery management circuit 4 may measure current I flowing through second main switch LM or obtain the value of current I from a current measurement circuit provided outside battery management circuit 4.

Subsequently, control circuit 10 forms a first path. In other words, control circuit 10 turns on first sub switch HS to form a path for a high-side current (S07). Control circuit 10 then determines whether voltage VC of capacitor connection terminal 16 is greater than or equal to predetermined value th5 (S08). When this condition is not satisfied (S08: NO), control circuit 10 determines whether elapsed time t that elapsed after first sub switch HS is turned on is less than or equal to limit time th6 (S09). When elapsed time t is less than or equal to limit time th6 (S09: YES), control circuit 10 returns to S07. When elapsed time t exceeds limit time th6 (S09: NO), control circuit 10 turns off all of the switches and stops all of the currents (S14). When the condition is satisfied in S08 (S08: YES), control circuit 10 turns off first sub switch HS and turns on first main switch HM (S10). Thus, in period T11 in FIG. 6, that is, a period from S06 to S10, control circuit 10 determines whether the connection operations of second main switches LM in all of other battery management circuits 4 are turned off, based on potential difference VC detected by detector 9. When determining that the connection operations are turned off, control circuit 10 causes battery management circuit 4 to perform a new connection operation.

Subsequently, control circuit 10 determines whether elapsed time t that elapsed after first main switch HM is turned on exceeds predetermined period th7, or whether current I flowing through first main switch HM exceeds limit current th8 (S11). When this condition is not satisfied (S11: NO), control circuit 10 returns to S10. When the condition is satisfied (S11: YES), control circuit 10 turns off first main switch HM and waits for a predetermined period of time (S12). Note that battery management circuit 4 may measure current I flowing through first main switch HM or obtain the value of current I from a current measurement circuit provided outside battery management circuit 4.

Subsequently, control circuit 10 determines whether to end the process (S13). When determining not to end the process (S13: NO), control circuit 10 returns to S01. When determining to end the process (S13: YES), control circuit 10 turns off all of the switches and stops all of the currents (S14). Note that whether to end the process depends on whether variance in output voltages among the sets of battery cells 1 falls within a predetermined range, that is, whether the output voltages are balanced.

All of control circuits 10 that belong to battery management circuits 4 can be unified by using the flow of the same process illustrated in FIG. 5. In the flow of the process, second main switches LM that are low-side switches are turned on at the same timing and first main switches HM that are high-side switches can be also turned on at the same timing.

Note that predetermined values th1 and th5 may be same or different. Limit times th2 and th6 may be same or different. Predetermined periods th3 and th7 may be same or different. Limit currents th4 and th8 may be same or different.

Next, an operation performed in case of failures will be described.

In the case where any one of first main switches HM (high-side main switches) or any one of second main switches LM (low-side main switches) is short-circuited or any one of capacitor connection terminals 16 is short-circuited with positive connection terminal 14 or negative connection terminal 15 in battery management circuits 4, or capacitor 3 is short-circuited, it is possible to stop a voltage balancing process in the flow of the process illustrated in FIG. 5.

When any one of first main switches HM is short-circuited or any one of capacitor connection terminals 16 is short-circuited with positive connection terminal 14, control circuit 10 continues the processes of S02, S03, and S01 in a loop after turning on second sub switch LS in S01. Since the voltage of capacitor connection terminal 16 does not rise to a predetermined value or larger within limit time th2, control circuit 10 proceeds to S14 after NO in the determination performed in S03 and turns off all of the switches and stops all of the currents. In other words, battery management circuit 4 stops the voltage balancing process.

When any one of second main switches LM is short-circuited or any one of capacitor connection terminals 16 is short-circuited with negative connection terminal 15, control circuit 10 continues the processes of S08, S09, and S07 in a loop after turning on first sub switch HS in S07. Since the voltage of capacitor connection terminal 16 does not fall to a predetermined value or smaller within limit time th6, control circuit 10 proceeds to S14 after NO in the determination performed in S09 and turns off all of the switches and stops all of the currents. In other words, battery management circuit 4 stops the voltage balancing process.

In the case where capacitor 3 is short-circuited, control circuit 10 proceeds to S14 after NO in the determination performed in either S03 or S09, and turns off all of the switches and stops all of the currents. In other words, battery management circuit 4 stops the voltage balancing process.

Accordingly, in any of the above cases of failures, it is possible to stop the voltage balancing process without any excessive amount of current flowing to battery management circuit 4 and capacitor 3.

According to battery management circuit 4 with the control method as described above, it is possible for all of control circuits 10 to independently and simultaneously detect any of the failures as described above to stop a voltage balancing process even if any of the failures occurs in any part of energy storage device 100 operating for multiple sets of battery cells 1. There is therefore no need to provide, between battery management circuits 4, signal transmission lines for conveying information on a failure detected by any one of battery management circuits 4 to another battery management circuit 4. Thus, the circuits do not get complicated.

Note that battery management circuit 4 may include a communication circuit for mutually communicating with another battery management circuit 4. Thus, the communication circuit can convey failure information to another control circuit 10.

As described above, with battery management circuit 4 according to the present disclosure, it is possible to reduce a power loss in a voltage balancing process. In addition, it is possible to surely stop the voltage balancing process in case of failures.

As has been described above, battery management circuit 4 according to the embodiment is a battery management circuit provided for each of sets of battery cells 1 connected in series in energy storage device 100 including the sets of battery cells 1 and at least one capacitor 3. Battery management circuit 4 includes: positive connection terminal 14 to be connected to a positive electrode of a corresponding one of the sets of battery cells 1; negative connection terminal 15 to be connected to a negative electrode of the corresponding one of the sets of battery cells 1; capacitor connection terminal 16 to be connected to a terminal of at least one capacitor 3; and control circuit 10 that controls a connection operation of connecting positive connection terminal 14 or negative connection terminal 15 to capacitor connection terminal 16, and causes battery management circuit 4 to perform the connection operation in synchronization with a connection operation of another battery management circuit 4 among battery management circuits 4 each of which is battery management circuit 4.

Accordingly, since battery management circuits 4 operate independently but in synchronization with each other, it is possible to reduce a power loss in a voltage balancing process. Moreover, a control unit that intensively controls battery management circuits 4 is unnecessary, and also, signal transmission lines for supplying a switching signal to each switch corresponding to battery cells 1 are unnecessary. Since there are no delay errors of switching signals, it is possible for battery management circuits 4 to readily operate in synchronization with each other regardless of whether the number of battery cells 1 is small or large.

Battery management circuit 4 may further include detector 9 that detects a potential difference between capacitor connection terminal 16 and positive connection terminal 14 or between capacitor connection terminal 16 and negative connection terminal 15, wherein control circuit 10 causes battery management circuit 4 to perform the connection operation in synchronization with the connection operation of another battery management circuit 4, using a result of the detection by detector 9.

Accordingly, it is possible for a battery management circuit to operate in synchronization with the connection operation of another battery management circuit, using a potential difference between a capacitor connection terminal and a positive connection terminal or between the capacitor connection terminal and a negative connection terminal.

Control circuit 10 may determine whether the connection operation of another battery management circuit 4 is turned off, based on the potential difference detected by detector 9, and causes battery management circuit 4 to perform a new connection operation when it is determined that the connection operation of another battery management circuit 4 is turned off.

Accordingly, it is possible to determine whether the connection operation of another battery management circuit is turned off, based on a potential difference detected by the detector. When it is determined that the connection operation is turned off, it is possible for a battery management to operate in synchronization with the other battery management by performing a new connection operation.

Battery management circuit 4 may include first main switch HM that connects capacitor connection terminal 16 to positive connection terminal 14; and first sub switch HS that forms a first path in which a potential difference is generated by a current flowing from positive connection terminal 14 to capacitor connection terminal 16. Control circuit 10 may turn on first main switch HM after detector 9 detects that the potential difference in the first path rises to a first predetermined value within a first period after first sub switch HS is turned on.

Accordingly, it is possible for a battery management circuit to operate in synchronization with another battery management circuit by determining whether the connection operation of the other battery management circuit is turned off (i.e., whether the potential difference rises to a predetermined value), based on a potential difference in the first path formed by first sub switch HS.

Battery management circuit 4 may include second main switch LM that connects capacitor connection terminal 16 to negative connection terminal 15; and second sub switch LS that forms a second path in which a potential difference is generated by a current flowing from capacitor connection terminal 16 to negative connection terminal 15. Control circuit 10 may turn on second main switch LM after detector 9 detects that the potential difference in the second path falls to a second predetermined value within a second period after second sub switch LS is turned on.

Accordingly, it is possible for a battery management circuit to operate in synchronization with another battery management circuit by determining whether the connection operation of the other battery management circuit is turned off (i.e., whether the potential difference falls to a predetermined value), based on a potential difference in the second path formed by second sub switch LS.

Battery management circuit 4 may further include: timer circuit 19 that sets an on time of each of first main switch HM and second main switch LM; and timer control circuit 20 that adjusts the on time set by timer circuit 19, to reduce a difference between the on time set by timer circuit 19 and an on time set by timer circuit 19 in another battery management circuit 4 among battery management circuits 4 each of which is battery management circuit 4.

Accordingly, it is possible to adjust variance in the ON times of first main switches HM in battery management circuits 4, and adjust also variance in the ON times of second main switches LM.

Timer control circuit 20 may adjust the on time set by timer circuit 19, in accordance with (i) a period of time from when first sub switch HS is turned on until when the potential difference in the first path rises to the first predetermined value or (ii) a period of time from when second sub switch LS is turned on until when the potential difference in the second path falls to the second predetermined value.

Accordingly, it is possible to adjust the ON time of first main switch HM or the ON time of second main switch LM to a more appropriate time.

Battery management circuit 4 according to the embodiment is a battery management circuit provided for each of sets of battery cells 1 connected in series in energy storage device 100 including the sets of battery cells 1 and capacitor 3. Battery management circuit 4 includes: positive connection terminal 14 to be connected to a positive electrode of a corresponding one of the sets of battery cells 1; negative connection terminal 15 to be connected to a negative electrode of the corresponding one of the sets of battery cells 1; capacitor connection terminal 16 to be connected to a terminal of capacitor 3; first main switch HM that connects capacitor connection terminal 16 to positive connection terminal 14; second main switch LM that connects capacitor connection terminal 16 to negative connection terminal 15; first sub switch HS that forms a first path in which a potential difference is generated by a current flowing from positive connection terminal 14 to capacitor connection terminal 16; second sub switch LS that forms a second path in which a potential difference is generated by a current flowing from capacitor connection terminal 16 to negative connection terminal 15; and control circuit 10 that performs control to (i) turn on first main switch HM in accordance with the potential difference in the first path, and (ii) turn on second main switch LM in accordance with the potential difference in the second path.

Accordingly, since battery management circuits 4 operate independently but in synchronization with each other, it is possible to reduce a power loss in a voltage balancing process. Moreover, battery management circuits 4 can readily operate in synchronization with each other regardless of whether the number of battery cells 1 is small or large.

Battery management circuit 4 may further include detector 9 that detects the potential difference in the first path and the potential difference in the second path. Control circuit 10 performs the control in synchronization with another battery management circuit 4 among battery management circuits 4 each of which is battery management circuit 4, using a result of the detection by detector 9.

Accordingly, it is possible for battery management circuit 4 to operate in synchronization with another battery management circuit 4, using a potential difference between capacitor connection terminal 16 and positive connection terminal 14 or between capacitor connection terminal 16 and negative connection terminal 15.

Control circuit 10 may: turn on first main switch HM after detector 9 detects that the potential difference in the first path rises to a first predetermined value within a first period after first sub switch HS is turned on; and turn on second main switch LM after detector 9 detects that the potential difference in the second path falls to a second predetermined value within a second period after second sub switch LS is turned on.

Accordingly, it is possible for a battery management circuit to operate in synchronization with another battery management circuit by determining whether the connection operation of the other battery management circuit is turned off (i.e., whether the potential difference rises to a predetermined value), based on a potential difference in the first path formed by the first sub switch. Moreover, it is possible for the battery management circuit to perform a connection operation in synchronization with another battery management circuit by determining whether the connection operation of the other battery management circuit is turned off (i.e., whether the potential difference falls to a predetermined value), based on a potential difference in the second path formed by the second sub switch.

The first path and the second path may share a resistive element for detection of the potential difference.

Accordingly, it is possible, with only one resistive element, to generate a potential difference in the first path and a potential difference in the second path.

The first path may have first current source 17 for supplying a current that flows from positive connection terminal 14 to capacitor connection terminal 16; and the second path may have second current source 18 for supplying a current that flows from capacitor connection terminal 16 to negative connection terminal 15.

Accordingly, a potential difference in the first path and a potential difference in the second path are generated respectively by current sources 17 and 18. It is therefore possible to enhance accuracy in the detection of a potential difference.

Energy storage device 100 according to the embodiment includes: the above-described battery management circuit 4; the above-described at least one capacitor 3; and the above-described sets of battery cells 1.

Accordingly, since battery management circuits operate independently but in synchronization with each other, it is possible to reduce a power loss in a voltage balancing process. Moreover, the battery management circuits can readily operate in synchronization with each other regardless of whether the number of battery cells 1 is small or large.

The battery management method according to the embodiment is a battery management method to be performed by battery management circuit 4 provided for each of sets of battery cells 1 connected in series in energy storage device 100 including the sets of battery cells 1 and at least one capacitor 3. Battery management circuit 4 includes: positive connection terminal 14 to be connected to a positive electrode of a corresponding one of the sets of battery cells 1; negative connection terminal 15 to be connected to a negative electrode of the corresponding one of the sets of battery cells 1; capacitor connection terminal 16 to be connected to a terminal of the at least one capacitor 3; and control circuit 10 that controls a connection operation of connecting positive connection terminal 14 or negative connection terminal 15 to capacitor connection terminal 16. The battery management method includes: determining whether a connection operation in battery management circuit 4 for another one of the sets of battery cells 1 is turned off; and performing a new connection operation when it is determined that the connection operation in battery management circuit 4 for the other one of the sets of battery cells 1 is turned off.

Accordingly, since the battery management circuits operate independently but in synchronization with each other, it is possible to reduce a power loss in a voltage balancing process. Moreover, battery management circuits 4 can readily operate in synchronization with each other regardless of whether the number of battery cells 1 is small or large.

Although battery management circuit 4, energy storage device 100, and the battery management method according to one or more aspects of the present disclosure have been described based on the embodiment, the present disclosure is not limited to the embodiment. Various modifications to the embodiment which may be conceived by those skilled in the art, as well as embodiments resulting from arbitrary combinations of elements from different embodiments are included within the scope of the one or more aspects so long as they do not depart from the essence of the present disclosure.

The invention claimed is:

1. A battery management circuit provided for each of sets of battery cells connected in series in an energy storage device including the sets of the battery cells and at least one capacitor that is less in number than a total number of the sets of the battery cells by one, the battery management circuit comprising:
a positive connection terminal to be connected to a positive electrode of a corresponding one of the sets of the battery cells;
a negative connection terminal to be connected to a negative electrode of the corresponding one of the sets of the battery cells;
a capacitor connection terminal to be connected to a terminal of the at least one capacitor;
a control circuit that controls a connection operation of connecting the positive connection terminal or the negative connection terminal to the capacitor connection terminal, and causes the battery management circuit to perform the connection operation in synchronization with a connection operation of an other battery management circuit among a plurality of battery management circuits including the battery management circuit; and
a detector that detects a potential difference between the capacitor connection terminal and the positive connection terminal or between the capacitor connection terminal and the negative connection terminal, wherein:
the control circuit
causes the battery management circuit to perform the connection operation in synchronization with the connection operation of the other battery management circuit, using a result of the detection by the detector, and
determines whether the connection operation of the other battery management circuit is turned off, based on the potential difference detected by the detector, and causes the battery management circuit to perform a new connection operation when it is determined that the connection operation of the other battery management circuit is turned off.

2. An energy storage device comprising:
the battery management circuit according to claim 1;
the at least one capacitor; and
the sets of the battery cells.

3. The battery management circuit according to claim 1, further comprising:
a first main switch that connects the capacitor connection terminal to the positive connection terminal; and
a first sub switch that forms a first path in which a potential difference is generated by a current flowing from the positive connection terminal to the capacitor connection terminal, wherein the control circuit turns on the first main switch after the detector detects that the potential difference in the first path rises to a first predetermined value within a first period after the first sub switch is turned on.

4. The battery management circuit according to claim 3, further comprising:
a second main switch that connects the capacitor connection terminal to the negative connection terminal; and
a second sub switch that forms a second path in which a potential difference is generated by a current flowing from the capacitor connection terminal to the negative connection terminal, wherein
the control circuit turns on the second main switch after the detector detects that the potential difference in the second path falls to a second predetermined value within a second period after the second sub switch is turned on.

5. The battery management circuit according to claim 3, further comprising:
a second main switch that connects the capacitor connection terminal to the negative connection terminal; and
a second sub switch that forms a second path in which a potential difference is generated by a current flowing from the capacitor connection terminal to the negative connection terminal, wherein
the control circuit turns on the second main switch after the detector detects that the potential difference in the second path falls to a second predetermined value within a second period after the second sub switch is turned on.

6. The battery management circuit according to claim 5, further comprising:
a timer circuit that sets an on time of each of the first main switch and the second main switch; and
a timer control circuit that adjusts the on time set by the timer circuit, to reduce a difference between the on time set by the timer circuit and an on time set by a timer circuit in an other battery management circuit among the plurality of battery management circuits.

7. The battery management circuit according to claim 6, wherein
the timer control circuit adjusts the on time set by the timer circuit, in accordance with (i) a period of time from when the first sub switch is turned on until when the potential difference in the first path rises to the first predetermined value or (ii) a period of time from when the second sub switch is turned on until when the potential difference in the second path falls to the second predetermined value.

8. A battery management circuit provided for each of sets of battery cells connected in series in an energy storage device including the sets of the battery cells and a capacitor, the battery management circuit comprising:
a positive connection terminal to be connected to a positive electrode of a corresponding one of the sets of the battery cells;
a negative connection terminal to be connected to a negative electrode of the corresponding one of the sets of the battery cells;
a capacitor connection terminal to be connected to a terminal of the capacitor;
a first main switch that connects the capacitor connection terminal to the positive connection terminal;
a second main switch that connects the capacitor connection terminal to the negative connection terminal;

a first sub switch that forms a first path in which a potential difference is generated by a current flowing from the positive connection terminal to the capacitor connection terminal;

a second sub switch that forms a second path in which a potential difference is generated by a current flowing from the capacitor connection terminal to the negative connection terminal; and a control circuit that performs control to (i) turn on the first main switch in accordance with the potential difference in the first path, and (ii) turn on the second main switch in accordance with the potential difference in the second path.

9. The battery management circuit according to claim 8, further comprising:

a detector that detects the potential difference in the first path and the potential difference in the second path, wherein the control circuit performs the control in synchronization with an other battery management circuit among the plurality of battery management circuits, using a result of the detection by the detector.

10. The battery management circuit according to claim 9, wherein the control circuit:

turns on the first main switch after the detector detects that the potential difference in the first path rises to a first predetermined value within a first period after the first sub switch is turned on; and turns on the second main switch after the detector detects that the potential difference in the second path falls to a second predetermined value within a second period after the second sub switch is turned on.

11. The battery management circuit according to claim 8, wherein the first path and the second path share a resistive element for detection of the potential difference.

12. The battery management circuit according to claim 8, wherein the first path has a first current source for supplying a current that flows from the positive connection terminal to the capacitor connection terminal; and the second path has a second current source for supplying a current that flows from the capacitor connection terminal to the negative connection terminal.

13. A battery management method to be performed by a battery management circuit provided for each of sets of battery cells connected in series in an energy storage device including the sets of the battery cells and at least one capacitor that is less in number than a total number of the sets of the battery cells by one, the battery management circuit including:

a positive connection terminal to be connected to a positive electrode of a corresponding one of the sets of the battery cells;

a negative connection terminal to be connected to a negative electrode of the corresponding one of the sets of the battery cells;

a capacitor connection terminal to be connected to a terminal of the at least one capacitor;

a control circuit that controls a connection operation of connecting the positive connection terminal or the negative connection terminal to the capacitor connection terminal; and a detector that detects a potential difference between the capacitor connection terminal and the positive connection terminal or between the capacitor connection terminal and the negative connection terminal, and the battery management method comprising:

determining whether a connection operation in a battery management circuit for an other one of the sets of the battery cells is turned off;

performing a new connection operation when it is determined that the connection operation in the battery management circuit for the other one of the sets of the battery cells is turned off, to perform the connection operation in synchronization with the connection operation of the other battery management circuit among the plurality of battery management circuits;

performing the connection operation in synchronization with the connection operation of the other battery management circuit, using a result of the detection by the detector; and determining whether the connection operation of the other battery management circuit is turned off, based on the potential difference detected by the detector, and performing a new connection operation when it is determined that the connection operation of the other battery management circuit is turned off.

* * * * *